(12) United States Patent
Guenther

(10) Patent No.: US 7,143,496 B2
(45) Date of Patent: Dec. 5, 2006

(54) HOT RUNNER NOZZLE WITH REMOVABLE TIP AND TIP RETAINER

(75) Inventor: Hans Guenther, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 360 days.

(21) Appl. No.: 10/839,337

(22) Filed: May 6, 2004

(65) Prior Publication Data

US 2004/0228942 A1 Nov. 18, 2004

Related U.S. Application Data

(60) Provisional application No. 60/468,629, filed on May 8, 2003.

(51) Int. Cl.
*B29C 45/20* (2006.01)

(52) U.S. Cl. ........................................ 29/521; 425/549

(58) Field of Classification Search ................ 425/562, 425/563, 564, 565, 566, 549; 29/521
See application file for complete search history.

(56) References Cited

U.S. PATENT DOCUMENTS

| | | |
|---|---|---|
| 4,434,053 A | 2/1984 | Osuna-Diaz |
| 4,746,635 A | 5/1988 | Inoue et al. |
| 4,875,848 A | 10/1989 | Gellert |
| 5,208,052 A | 5/1993 | Schmidt |
| 5,275,845 A | 1/1994 | Krings et al. |
| 5,299,928 A | 4/1994 | Gellert |
| 5,421,716 A | 6/1995 | Gellert |
| 5,569,475 A | 10/1996 | Adas et al. |
| 5,658,604 A | 8/1997 | Gellert et al. |
| 5,804,228 A | 9/1998 | Kofsman |
| 5,879,727 A | 3/1999 | Puri |
| 6,009,616 A | 1/2000 | Gellert |
| 6,164,954 A | 12/2000 | Mortazavi et al. |
| 6,227,461 B1 | 5/2001 | Schroeder et al. |
| 6,234,783 B1 | 5/2001 | Shibata et al. |
| 6,245,278 B1 | 6/2001 | Lausenhammer et al. |
| 6,302,680 B1 | 10/2001 | Gellert et al. |
| 6,315,549 B1 | 11/2001 | Jenko et al. |
| 6,318,990 B1 | 11/2001 | Gellert et al. |
| 6,331,106 B1 | 12/2001 | Helldin |
| 6,394,785 B1 | 5/2002 | Ciccone |
| 6,428,305 B1 | 8/2002 | Jenko |
| 6,530,770 B1 | 3/2003 | Sheffield et al. |

(Continued)

FOREIGN PATENT DOCUMENTS

EP 0 329 990 8/1989

(Continued)

OTHER PUBLICATIONS

Science of Vespel ® , http://www2.dupont.com/vespel/en_US/ Science.*

*Primary Examiner*—Tim Heitbrink
(74) *Attorney, Agent, or Firm*—McDonnell Boehnen Hulbert & Berghoff LLP

(57) ABSTRACT

An injection molding apparatus has at least a nozzle having a nozzle body and a nozzle tip. A securing device is used to secure the nozzle tip to the nozzle body via non-metallic threads or threads having a non-metallic coating that mate with complementary threads on the nozzle body. In this example, through use of the non-metallic threads or threads having a non-metallic coating, the securing device has a longer life than conventional securing devices that were made from steel or titanium by eliminating or substantially reducing thread galling.

32 Claims, 6 Drawing Sheets

U.S. PATENT DOCUMENTS

| | | |
|---|---|---|
| 6,533,571 B1 | 3/2003 | Filani |
| 6,609,902 B1 | 8/2003 | Blais et al. |
| 2002/0098262 A1 | 7/2002 | Babin |
| 2003/0082266 A1 | 5/2003 | Babin et al. |
| 2003/0086997 A1 | 5/2003 | Olaru |
| 2003/0211199 A1 | 11/2003 | Eigler et al. |
| 2006/0018993 A1* | 1/2006 | Fairy .......................... 425/564 |

FOREIGN PATENT DOCUMENTS

| | | |
|---|---|---|
| EP | 0 854 027 A1 | 7/1998 |
| FR | 2.051.891 | 4/1971 |
| JP | 6-143358 | 5/1994 |
| WO | WO 00/093111 | 2/2000 |
| WO | WO 01/98053 A1 | 12/2001 |
| WO | WO 03/028974 A1 | 4/2003 |

\* cited by examiner

HOT RUNNER NOZZLE WITH REMOVABLE TIP AND TIP RETAINER

CROSS REFERENCE TO RELATED APPLICATIONS

This application claims benefit under 35 U.S.C. §119(e) to U.S. Provisional Patent Application 60/468,629, filed May 8, 2003, entitled "Fast Removable Nozzle Tip," which is incorporated herein by reference in its entirety.

This application is related to U.S. Ser. No. 10/686,624, filed Oct. 17, 2003, entitled "Transfer Seal For A Removable Nozzle Tip Of An Injection Molding Apparatus," which is incorporated herein by reference in its entirety.

BACKGROUND OF THE INVENTION

1. Field of the Invention

The present invention relates generally to an injection molding apparatus and, in particular, to a securing device for a removable nozzle tip.

2. Background

Conventional injection molding nozzles include a nozzle body and a separate tip. The tip is typically made of a highly thermally conductive material that transfers heat from heaters, coupled to the nozzle body, to a melt flowing through the tip. The tip may include a threaded portion to allow for direct coupling to threads on the nozzle body or, alternatively, a removable securing device may be provided to secure the tip in abutment with the nozzle body. The securing device typically includes a threaded portion that mates with threads on the nozzle body. In addition to securing the tip to the nozzle body, the securing device can be used to insulate the tip from a mold cavity plate.

The securing device is typically made of a low thermally conductive material, such as steel or titanium, to insulate the tip from the mold cavity plate. The securing device can further form a seal with the mold cavity plate to prevent pressurized melt from escaping into an insulative air space that surrounds the nozzle body.

An injection molding apparatus having the nozzle, described above, may be shut down for various reasons. For example, it may be shut down for regular scheduled maintenance and operation faults. In addition, it may be shut down to replace the tip with another type of tip having a configuration suitable for a different molding application.

Typically, to replace the tip access must be gained to a forward end of the nozzle. The securing device is released from the nozzle body, which also releases the tip. Following replacement of the tip, the securing device is reattached to the nozzle body, which secures the replacement tip in position.

Contraction and expansion of both the nozzle body and the securing device typically occurs each time the injection molding apparatus is shut down and restarted. This can cause the threads on the nozzle body and the securing device to rub against one another. This rubbing can result in thread galling. Unfortunately, the material that the threads are typically made from is particularly susceptible to this process.

Thread galling is prevalent in threads that are made from metals that generate a protective oxide surface film, such as stainless steel and titanium. As the threads of the nozzle body and the securing device rub against one another, the protective oxide film is broken down. Breaking down of the protective oxide film leads to increased adhesion between the threads. The adhesion causes removal and re-installation of the securing device from and to the nozzle body to become increasingly difficult. In an extreme case, thread galling may lead to seizing, or cold welding, of the threads. Once the threads have seized, any attempt to separate the securing device and the nozzle body will likely cause irreparable damage to the threads.

Conventional securing devices are not usually suitable for use with corrosive plastics, such as PVC (polyvinyl chloride) or TEFLON filled polyamide. Such plastics tend to corrode the securing device so that frequent replacement is necessary, which can be costly.

Conventional securing devices for nozzles can be used in some applications to provide a seal adjacent the nozzle, which can be used to limit the amount of molten material that resides around the mold gate. The seal is achieved through direct contact between the securing device and a surface of the mold, which is at a lower temperature.

Therefore, what is needed is a system and method that protect against thread galling of complementary threads located on a nozzle body and a securing device. Therefore, what is also needed is device that performs a sealing function made from a suitable material having a lower thermal conductivity than the material of the surrounding mold plate.

SUMMARY OF THE INVENTION

An embodiment of the present invention provides an injection molding apparatus including a manifold, a nozzle having a nozzle tip securing device, and a mold cavity. The manifold has a manifold channel. The nozzle has a nozzle body and a nozzle tip. The nozzle body has a threaded downstream end and a nozzle channel in communication with the manifold channel. The nozzle tip is located adjacent the threaded downstream end of the nozzle body, the nozzle tip having a nozzle tip channel in communication with the nozzle channel. The securing device secures the nozzle tip to the nozzle body, and has a threaded portion made from a non-metallic material that mates with the threaded downstream end of the nozzle body. The securing device is positioned to abut a mold cavity plate surrounding a mold gate, to provide a seal between the nozzle and the mold cavity plate. The mold gate provides fluid communication between the nozzle tip channel and the mold cavity.

Another embodiment of the present invention provides an injection molding apparatus including a nozzle having a securing device. The nozzle includes a nozzle body and a nozzle tip. The nozzle body has a threaded downstream end and a nozzle channel for transferring a melt stream of moldable material from a manifold to a mold cavity. The nozzle tip is located adjacent the threaded downstream end of the nozzle body, the nozzle tip having a nozzle tip channel in communication with the nozzle channel for receiving the melt stream. The securing device secures the nozzle tip to the nozzle body and includes a threaded portion made from a non-metallic material that mates with the threaded downstream end of the nozzle body. The securing device is positioned in abutment with a mold cavity plate surrounding a mold gate of the mold cavity and provides a seal between the nozzle body and the mold cavity plate.

Accordingly, in the example the nozzle tip securing device has to made from a material that has a lower thermal conductivity than the surrounding mold plate to substantially reduce or eliminate heat loss through the nozzle tip securing device.

A further embodiment of the present invention provides a method of making an injection molding apparatus including the steps of (a) forming a nozzle having (i) a nozzle body with a threaded downstream portion and a nozzle channel and (ii) a nozzle tip with a tip channel, (b) coupling the nozzle to a manifold having a manifold channel, such that the nozzle channel is in fluid communication with the manifold channel, (c) securing the nozzle tip to the nozzle body using a securing device having a threaded portion made from a non-metallic material that threadably engages with the threaded portion of the nozzle body and (d) coupling a mold cavity having a mold gate in fluid communication with the nozzle tip channel.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers may indicate identical or functionally similar elements.

DETAILED DESCRIPTION OF THE INVENTION

Overview

One or more embodiments of the present invention provide an injection molding apparatus having at least a nozzle having a nozzle body and a nozzle tip. A securing device is used to secure the nozzle tip to the nozzle body via non-metallic threads or threads having a non-metallic coating that mate with complementary metallic threads on the nozzle body. In this embodiment, through use of the non-metallic threads or threads having a non-metallic coating, the securing device has a longer life than conventional securing devices that are made from steel or titanium. The securing device in this embodiment also eliminates or substantially reduces thread galling through use of dissimilar materials for the complementary threads.

Exemplary Systems

Figure 1:
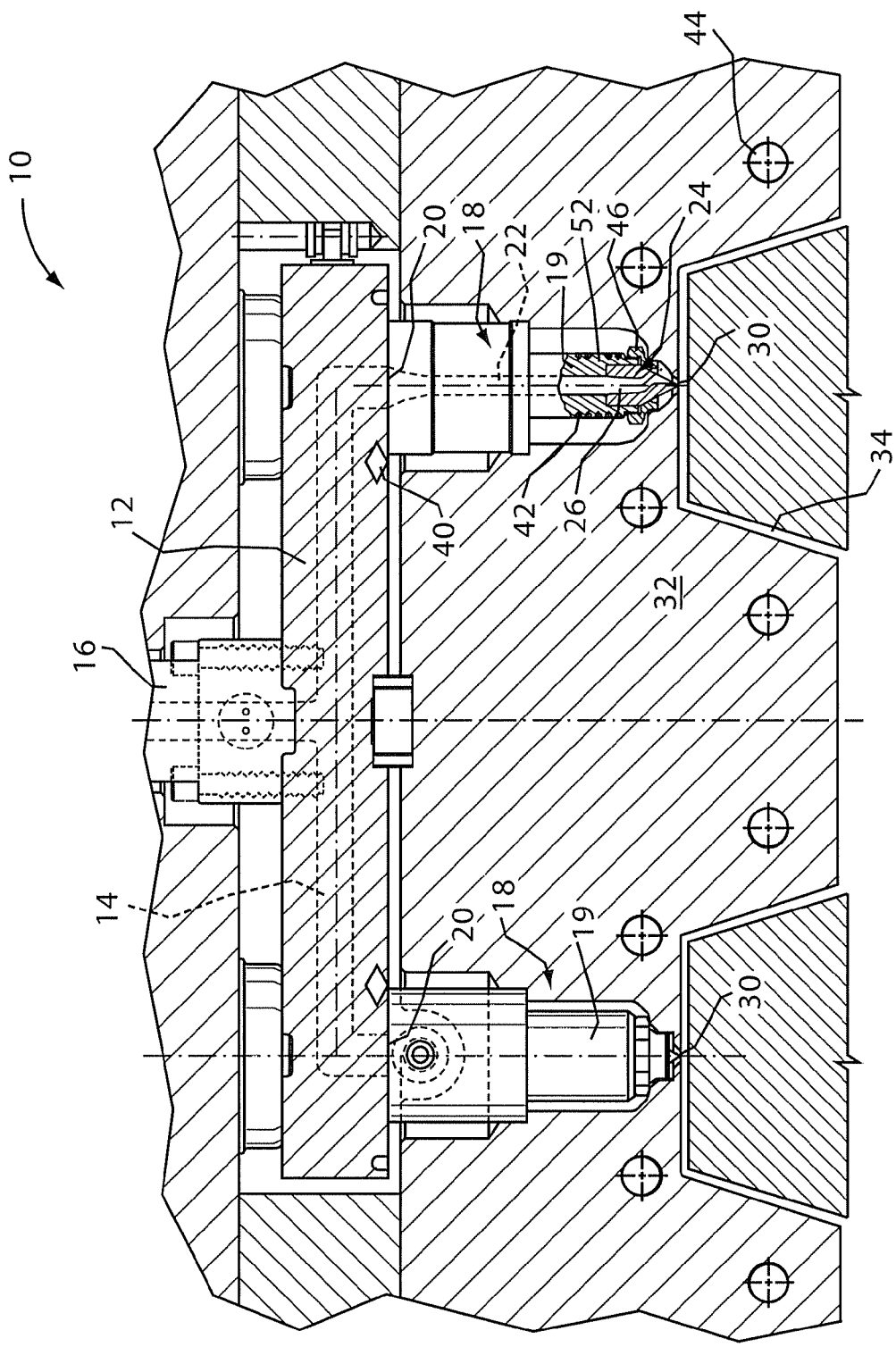
FIG. 1 is a side sectional view of an injection molding apparatus, according to one embodiment of the present invention.

FIG. 1 shows an injection molding apparatus 10, according to one embodiment of the present invention. In this embodiment, injection molding apparatus 10 includes a manifold 12 having a manifold melt channel 14, which receives a melt stream of moldable material under pressure from a sprue bushing 16. Sprue bushing 16 is in communication with a machine nozzle (not shown).

Injection molding apparatus 10 also includes one or more nozzles 18 that are coupled to respective outlets 20 of manifold 12. A nozzle channel 22 extends through a nozzle body 19 of each nozzle 18 to receive the melt stream of moldable material from manifold 12. A nozzle tip 24 is coupled to a downstream end of each nozzle 18. Each nozzle tip 24 includes a melt channel 26 that is aligned with a respective nozzle channel 22 for receiving the melt stream therefrom.

Mold gates 30 are provided in a mold cavity plate 32. Mold gates 30 open to allow delivery of the melt stream to respective mold cavities 34. In the example shown, mold gates 30 are thermal gated. However, in an alternative embodiment mold gates 30 are valve gated.

Manifold heaters 40 are used to heat manifold 12 and nozzle heaters 42 are used to heat nozzles 18 in order to maintain the melt stream at a desired temperature. Cooling channels 44 are provided adjacent mold gates 30 and mold cavities 34 in order to facilitate cooling of the melt stream in mold cavities 34. A securing device 46 is provided at a downstream end 52 of nozzle 18 to secure nozzle tip 24 to nozzle 18. For example, securing device 46 can be, but is not limited to, a transfer seal, a tip retainer, a nozzle seal, a gate seal, or the like.

Figure 2:
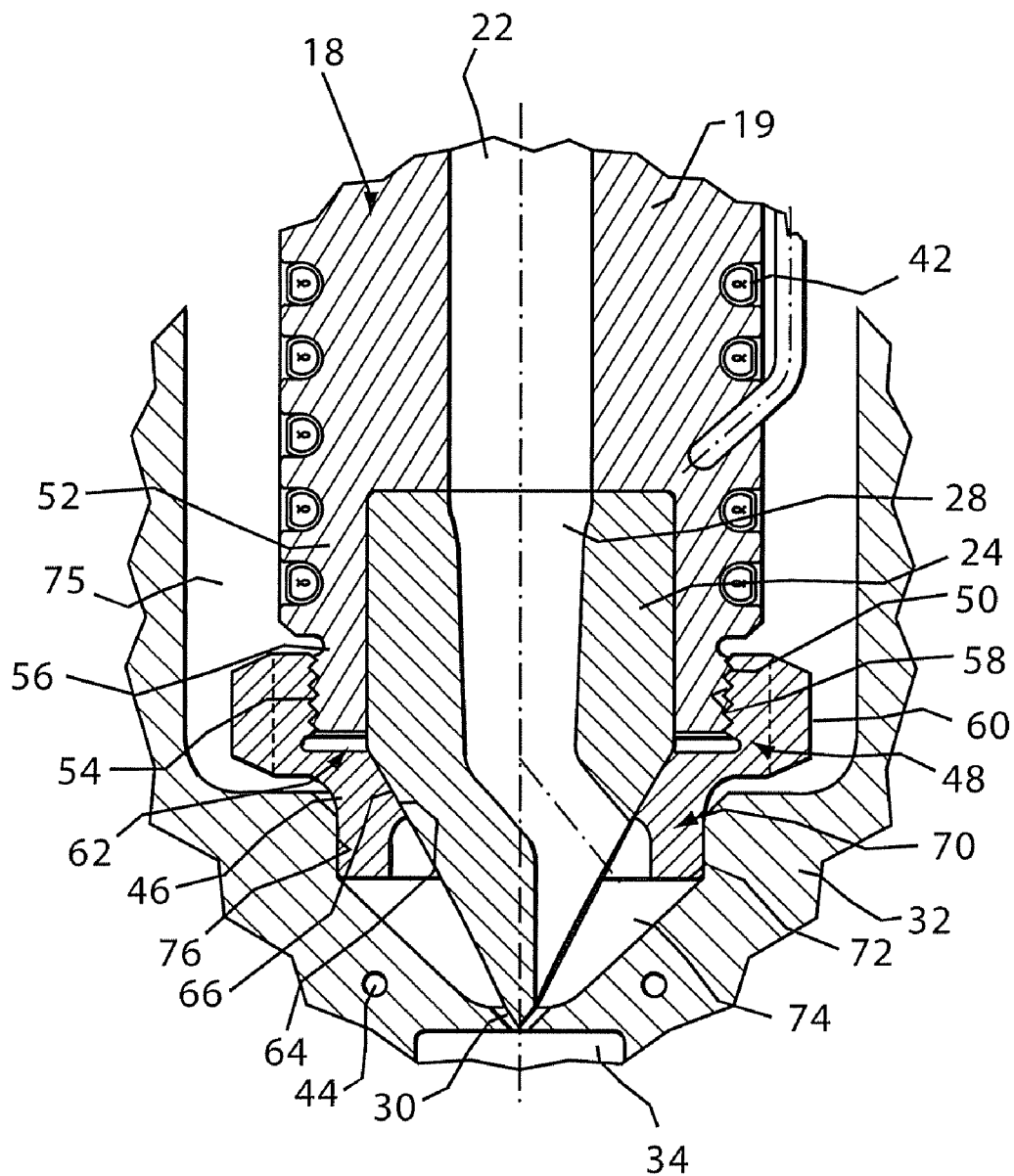
FIG. 2 is side sectional view of a portion of the injection molding apparatus of FIG. 1.

FIG. 2 shows securing device 46 including a threaded portion 48 having threads 50 formed on an inner wall 58 thereof. In one example, an outer wall 60 of threaded portion 48 is hexagonal nut-shaped for mating with a tool to allow for tightening or loosening of securing device 46. To couple securing device 46 to nozzle 18, threads 50 of threaded portion 48 mate with threads 54 formed on an outer surface 56 of downstream end 52 of the nozzle 18.

In this example, securing device 46 further includes a shoulder 62 that extends inwardly towards nozzle tip 24. Shoulder 62 includes a sloped surface 64 that abuts an outer surface 66 of nozzle tip 24. It is to be appreciated that in other examples shoulder 62 may be horizontal or sloped at any angle to accommodate various nozzle tip designs. A sealing portion 70 of securing device 46 extends in a downstream direction from shoulder 62. Sealing portion 70 includes a sealing face 72 that abuts a surrounding wall 76 of an opening 74 in mold cavity plate 32.

In one example, securing device 46 is made from a non-metallic material, for example, a ceramic material. Suitable types of ceramic materials include, but are not limited to, alumina, zirconia, silicon carbide, silicon nitride, aluminum nitride, and boron carbide. Suitable types of ceramics are commercially available from Dynamic-Ceramic Ltd., Crewe, UK; Industrial Jewels, Pvt, Ltd, India; Micro Tools Ltd., Israel; and Kyocera Corporation, Japan.

In another example, securing device 46 may be made of a polyimide, such as VESPEL® by Dupont of Delaware, of a sapphire, or other suitable crystalline material.

In another example, securing device 46 is made from a metallic material, while threaded portion 48 includes a coating or film of non-metallic material, for example, a ceramic material as described above. This can be formed via chemical vapor deposition, by spraying a thin film lubricant onto threaded portion 48, or other known methods.

In the embodiment of the present invention that utilizes a ceramic material for securing device 46, galling is less likely to occur between mating threads 48 and 50. This is because ceramics do not expand and contract to the same degree as materials that are conventionally used in such an application. Therefore, having a ceramic threaded portion 48 facilitates removal of securing device 46 and extends the life of both securing device 46 and nozzle 18. This can reduce repair and/or replacement frequency, and thus the cost of securing device 46 and nozzle tip 24.

Similarly, the properties of a ceramic material make it a suitable material for use on sealing face 72 of sealing portion 70 because sealing face 72 provides insulation between mold cavity plate 32 and nozzle tip 24. In one example, because securing device 46 is in contact with both hot nozzle tip 24 and cold mold cavity plate 32, securing device 46 having low thermal conductivity is desired.

In this embodiment, during operation the melt stream flows under pressure though manifold channel 16 of manifold 14 and into nozzle channels 22 of a plurality of nozzles 18 of injection molding apparatus 10. The melt flows from nozzle channels 22 into melt channels 28 of respective nozzle tips 24, past mold gates 30, and into mold cavities 34. Mold cavities 34 are then cooled by the coolant flowing through the cooling ducts 44. Once a predetermined amount of time has elapsed, molded parts are ejected from mold cavities 34.

In the embodiment shown, securing device 46 maintains nozzle tip 24 in abutment with nozzle 18 and provides a seal between surrounding wall 76 of mold cavity plate opening 74 and sealing face 72. This arrangement prevents melt from escaping into an insulative air space 75 that surrounds nozzle 18. Further, in this embodiment, securing device 46 insulates nozzle tip 24, when it is hot, from mold cavity plate 32, when it is cold.

Figure 3:
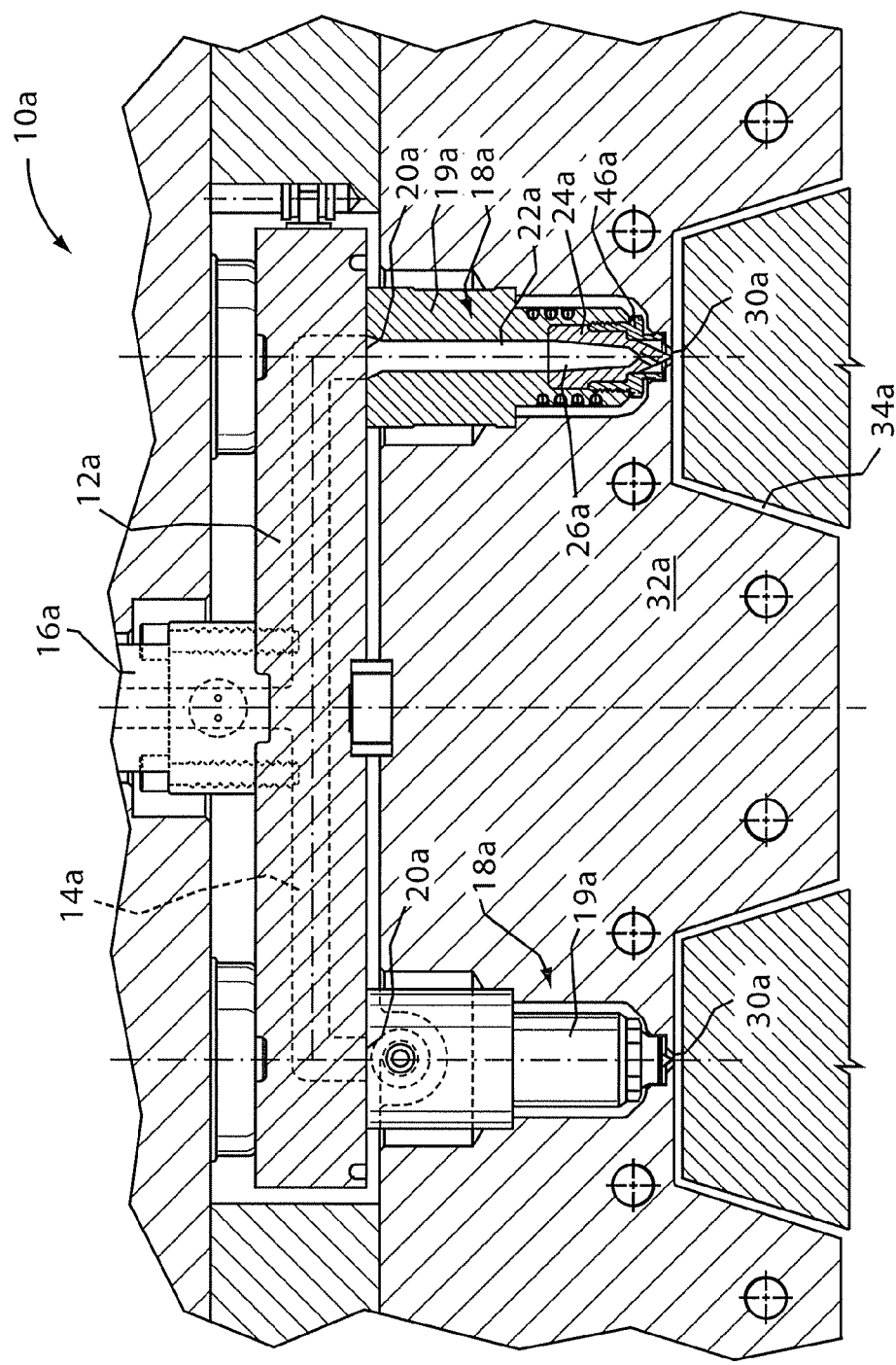
FIG. 3 is a partial side sectional view of an injection molding apparatus, according to another embodiment of the present invention.

FIG. 3 shows an injection molding apparatus 10*a*, according to another embodiment of the present invention. In this embodiment, injection molding apparatus 10*a* includes a manifold 12*a* having a manifold melt channel 14*a* that receives a melt stream of moldable material under pressure from a sprue bushing 16*a*. Sprue bushing 16*a* is in communication with a machine nozzle (not shown). Nozzles 18*a* are coupled to respective outlets 20*a* of manifold 12*a*. A nozzle channel 22*a* extends through a nozzle body 19*a* of each nozzle 18*a* to receive the melt stream of moldable material from outlets 20*a* of manifold 12*a*. A nozzle tip 24*a* is coupled to a downstream end of each nozzle 18*a*. Each nozzle tip 24*a* includes a melt channel 26*a* that is aligned with a respective nozzle channel 22*a* for receiving the melt stream therefrom. Mold gates 30*a* are provided in a mold cavity plate 32*a*. Mold gates 30*a* are openable to allow delivery of the melt stream to respective mold cavities 34*a*.

Figure 4:
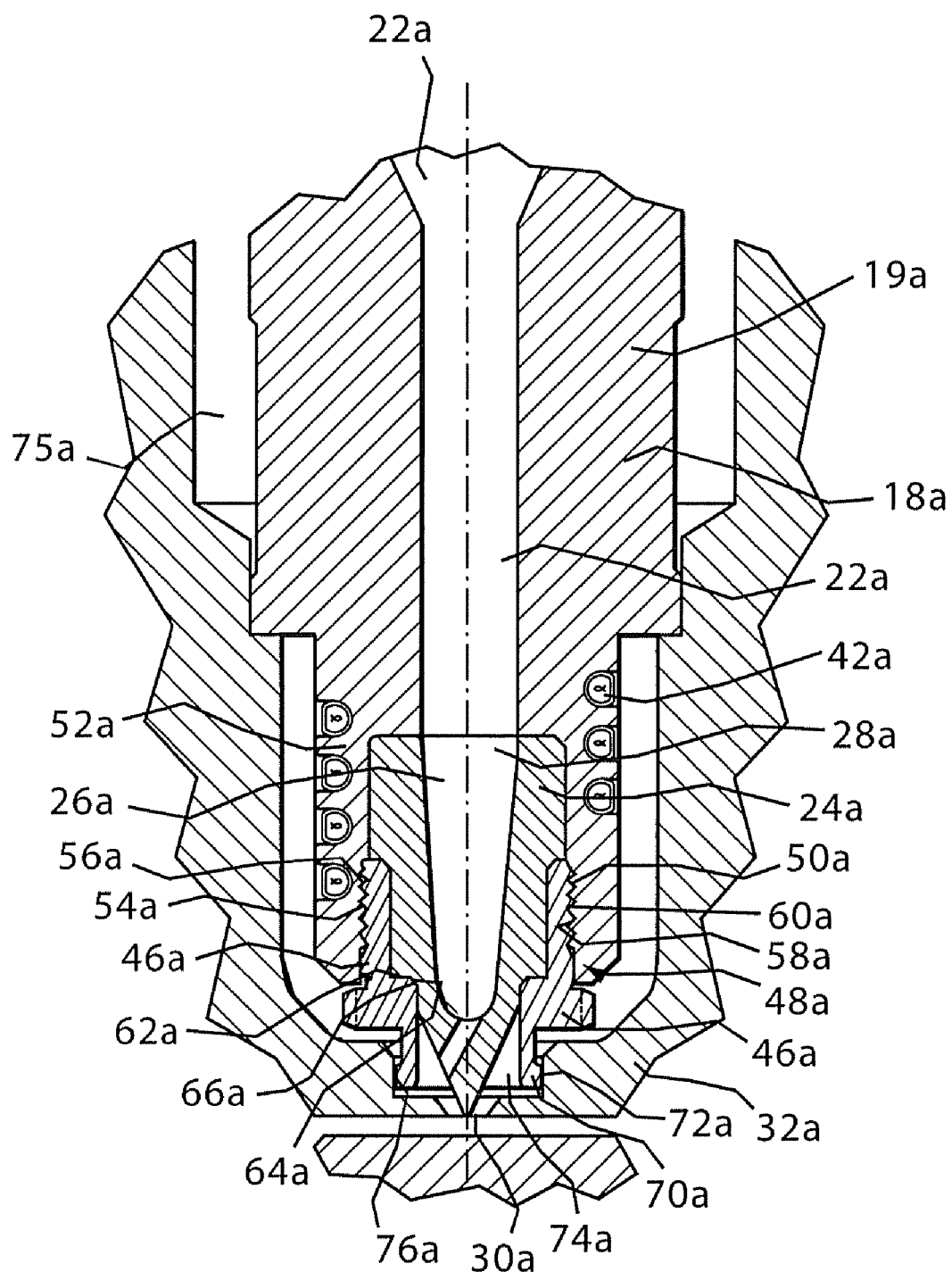
FIG. 4 is side sectional view of a portion of the injection molding apparatus of FIG. 3.

FIG. 4 shows securing device 46*a* including a threaded portion 48*a* having threads 50*a* formed on an outer wall 60*a* thereof. To couple securing device 46*a* to nozzle 18*a*, threads 50*a* of threaded portion 48*a* mate with threads 54*a* formed on an inner surface 56*a* of downstream end 52*a* of the nozzle 18*a*.

In this example, securing device 46*a* further includes a shoulder 62*a* that extends inwardly towards nozzle tip 24*a*. Shoulder 62*a* includes a sloped surface 64*a* that abuts an outer surface 66*a* of nozzle tip 24*a*. It is to be appreciated that in other examples shoulder 62*a* may be horizontal or sloped at any angle to accommodate various nozzle tip designs. A sealing portion 70*a* of securing device 46*a* extends in a downstream direction from shoulder 62*a*. Sealing portion 70*a* includes a sealing face 72*a* that abuts a surrounding wall 76*a* of an opening 74*a* in mold cavity plate 32*a*.

In one example, securing device 46*a* is made from a non-metallic material, for example, a ceramic material. Suitable types of ceramic materials include, but are not limited to, alumina, zirconia, silicon carbide, silicon nitride, aluminum nitride, sapphire and boron carbide. Suitable types of ceramics are commercially available from Dynamic-Ceramic Ltd., Crewe, UK; Industrial Jewels, Pvt, Ltd, India; Micro Tools Ltd., Israel; and Kyocera Corporation, Japan.

In another example, securing device 46*a* may be made of a polyimide, such as VESPEL® by Dupont of Delaware, of a sapphire, or other suitable crystalline material.

In another example, securing device 46*a* is made from a metallic material, while threaded portion 48*a* includes a coating or film of non-metallic material, for example, a ceramic material as described above. This can be formed via chemical vapor deposition, by spraying a thin film lubricant onto threaded portion 48*a*, or other known methods.

In the embodiment of the present invention that utilizes a ceramic material for securing device 46*a*, galling is less likely to occur between mating threads 48*a* and 50*a*. This is because ceramics do not expand and contract to the same degree as materials that are conventionally used in such an application Therefore, having a ceramic threaded portion 48*a* facilitates removal of securing device 46*a* and extends the life of both securing device 46*a* and nozzle 18*a*. This can reduce repair and/or replacement frequency, and thus the cost of securing device 46*a* and nozzle tip 24*a*.

Similarly, the properties of a ceramic material make it a suitable material for use on sealing face 72*a* of sealing portion 70*a* because sealing face 72*a* provides insulation between mold cavity plate 32*a* and nozzle tip 24*a*. In one example, because securing device 46 is in contact with both hot nozzle tip 24*a* and cold mold cavity plate 32*a*, securing device 46*a* having low thermal conductivity is desired.

In this embodiment, during operation the melt stream flows under pressure though manifold channel 16*a* of manifold 14*a* and into nozzle channels 22*a* of a plurality of nozzles 18*a* of injection molding apparatus 10*a*. The melt flows from nozzle channels 22*a* into melt channels 28*a* of respective nozzle tips 24*a*, past mold gates 30*a*, and into mold cavities 34*a*. Mold cavities 34*a* are then cooled by the coolant flowing through the cooling ducts 44*a*. Once a predetermined amount of time has elapsed, molded parts are ejected from mold cavities 34*a*.

In the embodiment shown, securing device 46 maintains nozzle tip 24*a* in abutment with nozzle 18*a* and provides a seal between surrounding wall 76*a* of mold cavity plate opening 74*a* and sealing face 72*a*. This arrangement prevents melt from escaping into an insulative air space 75*a* that surrounds nozzle 18. Further, in this embodiment, securing device 46*a* insulates nozzle tip 24*a*, when it is hot, from mold cavity plate 32*a*, when it is cold.

Figure 5:
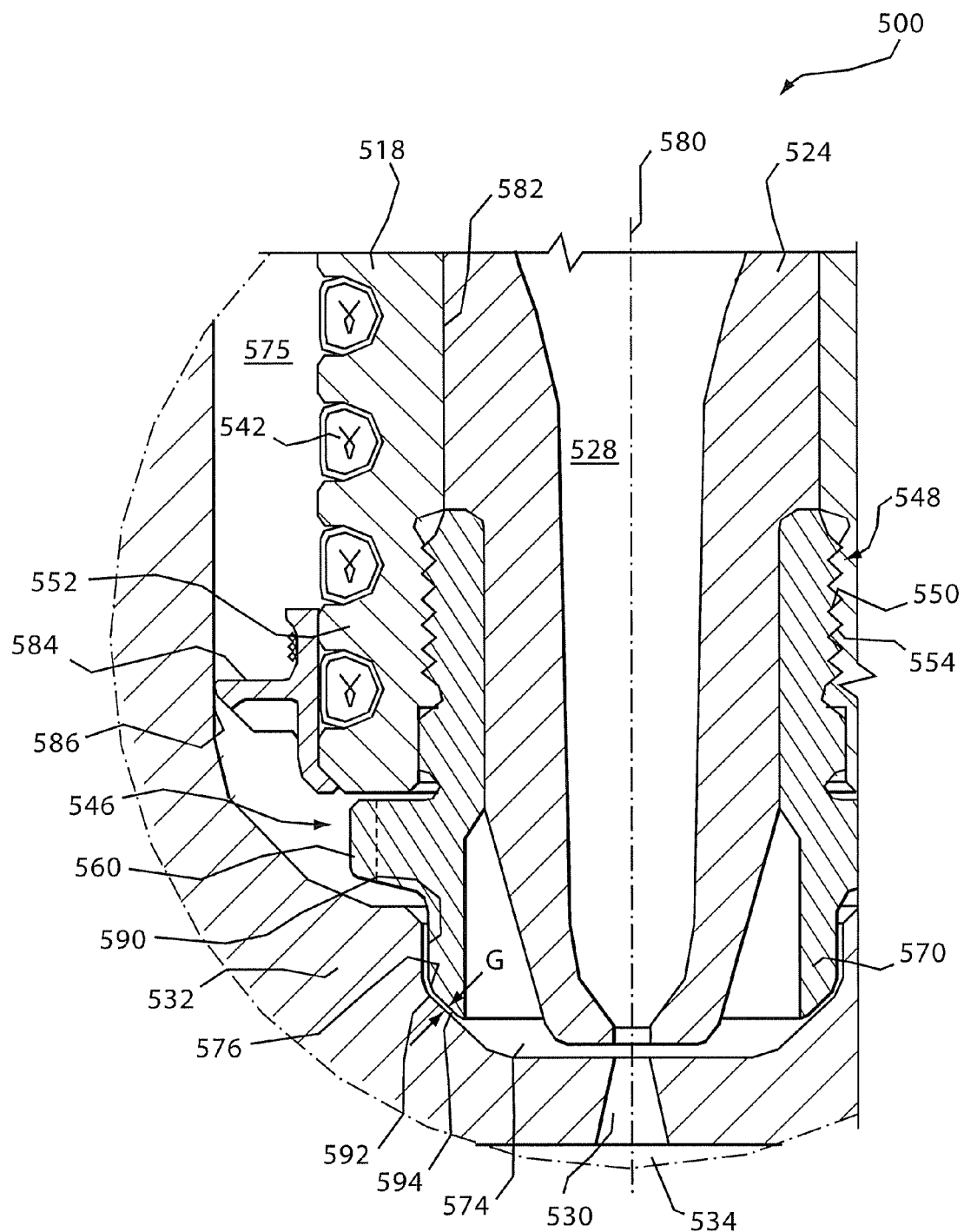
FIGS. 5 and 6 show nozzles according to other embodiments of the present invention.

FIG. 5 shows a nozzle 500 according to another embodiment of the present invention. All elements having similar numbers to the embodiments above are for the similar components of the embodiments above, unless otherwise described below. A similar nozzle is found in FIG. 2 of WO 03/028973 A1 to Babin et al., which is incorporated by reference herein in its entirety. In contrast to the nozzle in FIG. 2 of the WO 03/028973 patent, nozzle 500 includes either a non-metallic securing device 546 or a non-metallic film or coating on threaded portion 548 of securing device 546, as discussed in more detail above. A main difference between the embodiments discussed above and the embodiment shown in FIG. 5 is that a sealing function between securing device 546 and mold 532 is performed using a gap G or air space 592 forming a gap seal 594 between mold cavity sealing surface 576 and securing device sealing portion 570. Also, in FIG. 5 an axis 580 of nozzle 500 is shown, as well as a bore 582 of nozzle body 518 and bore 586 of mold 532. An optional alignment device 584 is shown, as well as an optional tool engaging portion found in outer wall 560. Thus, in this embodiment securing device 546 does not make direct contact with mold 532. Also, in this embodiment, gap G is filled with a thin film of cold molten material that will act as a partial or total seal.

Figure 6:
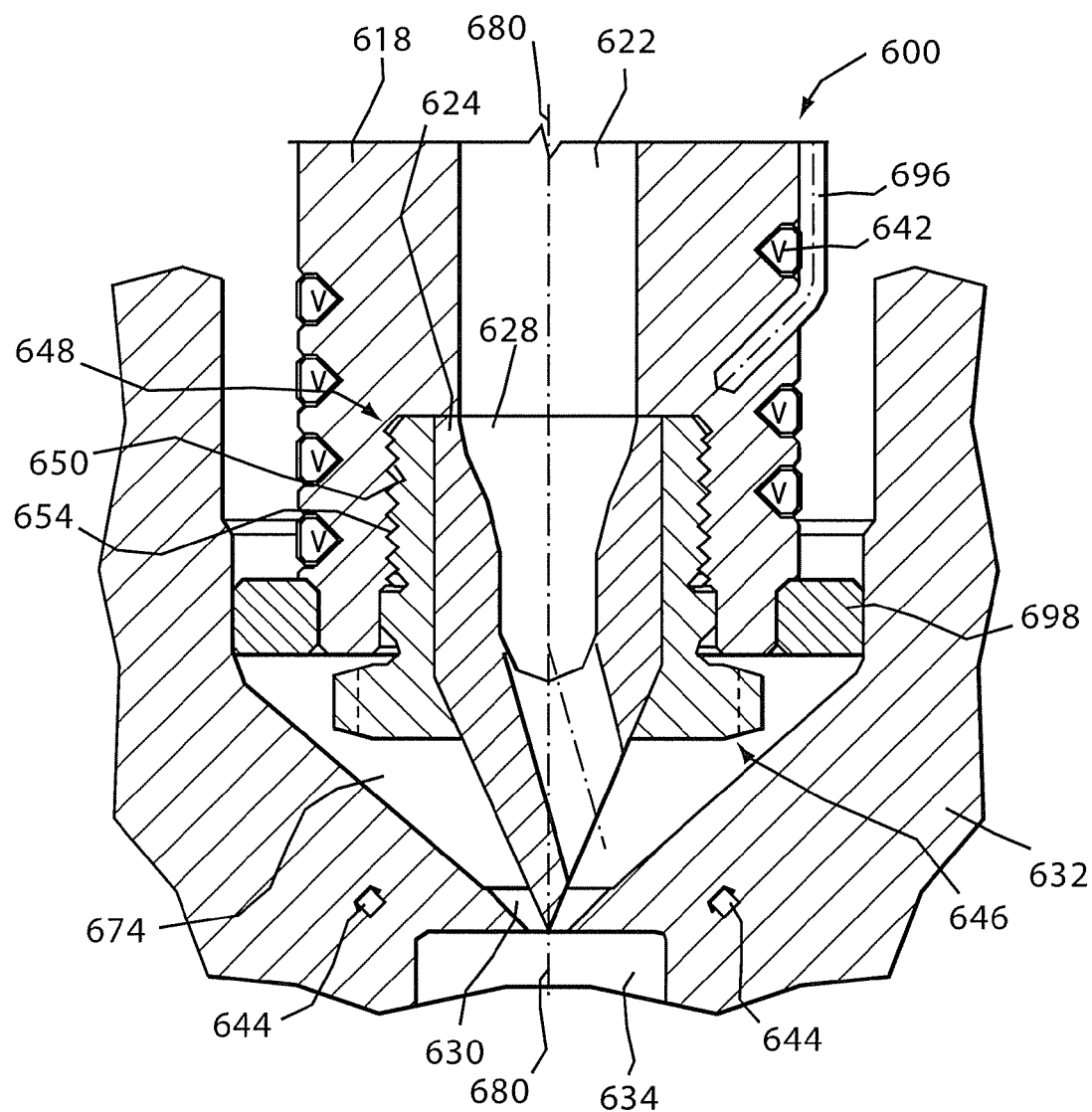

FIG. 6 shows a nozzle 600 according to another embodiment of the present invention. All elements having similar numbers to the embodiments above are for the similar components of the embodiments above, unless otherwise described below. A similar nozzle is found in FIG. 11 of U.S. Published Patent Application 2003/0086997 A1 to Olaru, which is incorporated by reference herein in its entirety. In contrast to the nozzle in FIG. 1 of the 2003/0086997 published application, nozzle 600 includes either a non-metallic securing device 646 or a non-metallic film or coating on threaded portion 648 of securing device 646, as discussed in more detail above. A main difference between the embodiments discussed above and the embodiment shown in FIG. 6 is that a sealing function between securing device 646 and mold 632 is performed using a sealing and aligning device 698, which has many sides that can perform the sealing and/or aligning function. Also, in FIG. 6 an axis 680 of nozzle 600 is shown, as well as an optional thermocouple device 696 located adjacent heating device 642. Thus, in this embodiment, securing device 646 does not make direct contact with mold 632.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An injection molding apparatus, comprising:
a manifold having a manifold channel;
a nozzle, including:
a nozzle body having a threaded portion on a downstream end and a nozzle channel in fluid communication with the manifold channel,
a nozzle tip located adjacent the downstream end of the nozzle body, the nozzle tip having a nozzle tip channel in fluid communication with the nozzle channel;
a mold cavity having a mold gate in fluid communication with the nozzle tip channel; and
a securing device for securing the nozzle tip to the nozzle body, having a threaded portion made from a non-metallic material for threadably engaging with the threaded portion of the nozzle body.

2. The injection molding apparatus of claim 1, wherein the securing device further comprises a shoulder that abuts at least a portion of an outer wall of the nozzle tip.

3. The injection molding apparatus of claim 2, wherein the shoulder includes a sloped surface for mating with the at least a portion of the outer wall of the nozzle tip.

4. The injection molding apparatus of claim 2, wherein the securing device further comprises a sealing portion having a sealing face that abuts a mold cavity plate that surrounds the mold gate; and the shoulder is located at an upstream end of the sealing portion.

5. The injection molding apparatus of claim 1, wherein the securing device abuts a mold cavity plate surrounding the mold gate.

6. The injection molding apparatus of claim 1, wherein the securing device further comprises a sealing portion having a sealing face that abuts the mold cavity plate.

7. The injection molding apparatus of claim 6, wherein a shoulder of the securing device is located between the threaded portion and the sealing portion and wherein the sealing portion extends in a downstream direction from the shoulder and includes the sealing face.

8. The injection molding apparatus of claim 6, wherein the sealing face is made from a thermally insulative material.

9. The injection molding apparatus of claim 8, wherein the thermally insulative material of the sealing face comprises one of a non-metallic material, a ceramic material, alumina, zirconia, silicon carbide, silicon nitride, aluminum nitride, sapphire, boron carbide, a polyimide, or a high temperature polymer.

10. The injection molding apparatus of claim 1, wherein the non-metallic material is selected from the group consisting of a ceramic material, a polyimide material, and a crystalline material.

11. The injection molding apparatus of claim 10, wherein the ceramic material is alumina, zirconia, silicon carbide, silicon nitride, aluminum nitride, or boron carbide.

12. The injection molding apparatus of claim 10, wherein the polyimide material is a high temperature polymer.

13. The injection molding apparatus of claim 10, wherein the crystalline material is sapphire.

14. The injection molding apparatus of claim 1, wherein the securing device is made entirely of the non-metallic material.

15. The injection molding apparatus of claim 14, wherein the non-metallic material is selected from the group consisting of a ceramic material, a polyimide material, and a crystalline material.

16. The injection molding apparatus of claim 15, wherein the ceramic material is alumina, zirconia, silicon carbide, silicon nitride, aluminum nitride, or boron carbide.

17. The injection molding apparatus of claim 1, wherein the threaded portion of the securing device is on an inner surface thereof to mate with the threaded portion of the nozzle body that is on an outer surface thereof.

18. The injection molding apparatus of claim 1, wherein the threaded portion of the securing device is on an outer surface thereof to mate with the threaded portion of the nozzle body that is on an inner surface thereof.

19. The injection molding apparatus of claim 1, wherein the securing device comprises one of a transfer seal, a tip retainer, a nozzle seal, or a gate seal.

20. A component in an injection molding apparatus, comprising:
a nozzle, including:
a nozzle body having a threaded portion and a nozzle channel,
a nozzle tip having a nozzle tip channel in communication with the nozzle channel, and
a securing device for securing the nozzle tip to the nozzle body and having a threaded portion made from a non-metallic material, wherein the threaded portion of the securing device mates with the threaded portion of the nozzle body.

21. The component of claim 20, wherein the non-metallic material is selected from the group consisting of a ceramic material, a polyimide material, and a crystalline material.

22. The component of claim 21, wherein the ceramic material is alumina, zirconia, silicon carbide, silicon nitride, aluminum nitride, or boron carbide.

23. The component of claim 21, wherein the polyimide material is a high temperature polymer.

24. The component of claim 21, wherein the crystalline material is sapphire.

25. The component of claim 20, wherein the securing device is made entirely of the non-metallic material.

26. The component of claim 25, wherein the non-metallic material is selected from the group consisting of a ceramic material, a polyimide material, and a crystalline material.

27. The component of claim 26, wherein the ceramic material is alumina, zirconia, silicon carbide, silicon nitride, aluminum nitride, or boron carbide.

28. The component of claim 20, wherein the threaded portion of the securing device is on an inner surface thereof to mate with the threaded portion of the nozzle body that is on an outer surface thereof.

29. The component of claim 20, wherein the threaded portion of the securing device is on an outer surface thereof to mate with the threaded portion of the nozzle body that is on an inner surface thereof.

30. The component of claim 20, wherein the securing device comprises one of a transfer seal, a tip retainer, a nozzle seal, or a gate seal.

31. A component in an injection molding apparatus, comprising:

a nozzle, including:

a nozzle body having a threaded portion in a downstream end and a nozzle channel in communication with a manifold channel, a nozzle tip located adjacent the downstream end of the nozzle body, the nozzle tip having a nozzle tip channel in communication with the nozzle channel; and a securing device for securing the nozzle tip to the nozzle body and having a threaded portion with a non-metallic coating, wherein the non-metallic coated threaded portion of the securing device mates with the threaded portion of the nozzle body.

32. A method of making an injection molding apparatus, comprising:

(a) forming a nozzle having (i) a nozzle body with a threaded downstream portion and a nozzle channel and (ii) a nozzle tip with a tip channel;

(b) coupling the nozzle to a manifold having a manifold channel, such that the nozzle channel is in fluid communication with the manifold channel;

(c) securing the nozzle tip to the nozzle body using a securing device having a threaded portion made from a non-metallic material that threadably engages with the threaded portion of the nozzle body; and (d) coupling a mold cavity having a mold gate in fluid communication with the nozzle tip channel.

* * * * *